United States Patent Office 2,775,509
Patented Dec. 25, 1956

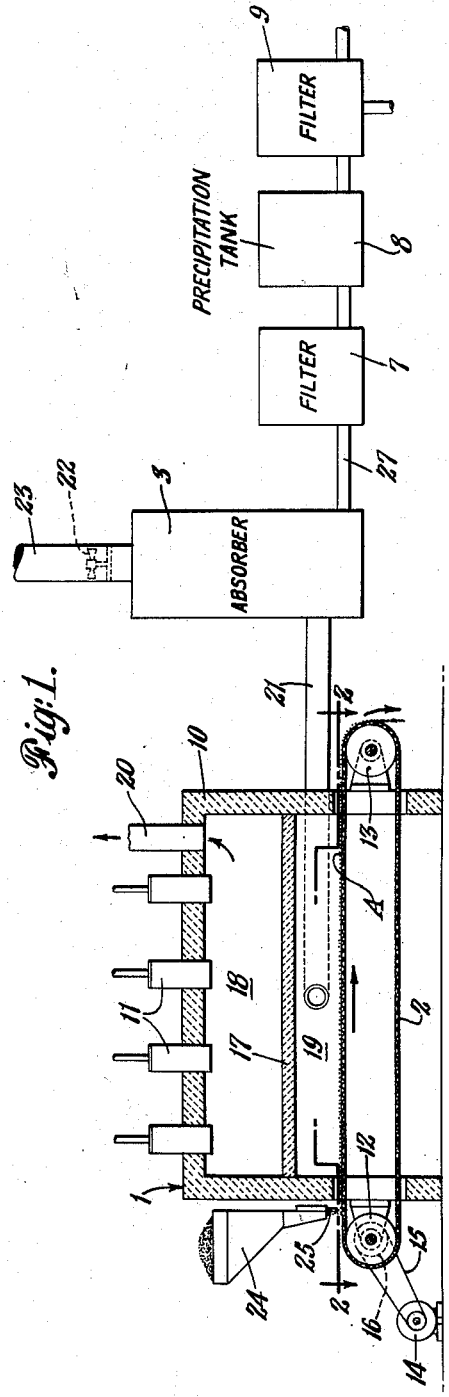
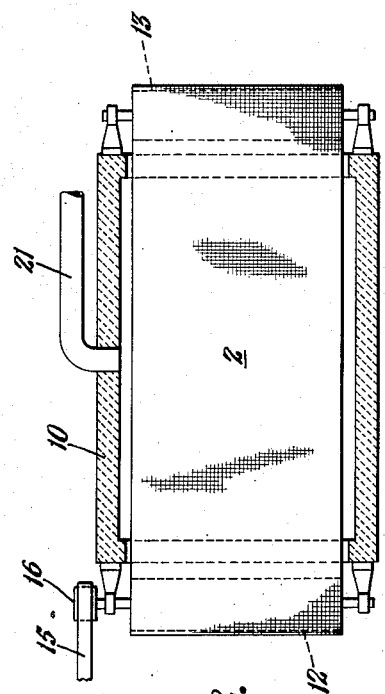

2,775,509

SELENIUM DIOXIDE VOLATILIZATION PROCESS

Yurii E. Lebedeff, Metuchen, and John R. Stone and Paul W. von Stein, Woodbridge, N. J., assignors to American Smelting and Refining Company, New York, N. Y., a corporation of New Jersey Application March 3, 1953, Serial No. 340,088

7 Claims. (Cl. 23—139)

This invention relates to the removal of the selenium values in slimes, sludges, anode muds and similar material from the electrolytic refining of impure copper (hereinafter for convenience sometimes referred to as "slimes") by a process in which such values are volatilized therefrom as selenium dioxide.

It has been found that when slimes are heated without fusion in an atmosphere of an oxygen-containing gas, such as air, selenium dioxide evolves slowly therefrom at temperatures up to about 1000° F. At temperatures above about 1000° F. the rate of evolution of the selenium dioxide increases rapidly so that in a relatively short time all or substantially all of the selenium values in the slimes can be volatilized as selenium dioxide.

It has been found also that when the slimes are partially or entirely fused, such increase in the rate of evolution of the selenium dioxide at temperatures above about 1000° F. is drastically reduced or substantially eliminated. In addition, substantial amounts of the selenium values remain in the fused or partially fused slimes even when such slimes are heated for prolonged periods at these higher temperatures. Thus, control of fusion is critically important in the volatilization of selenium values from the slimes in a commercially acceptable process.

In accordance with the above discoveries, the invention in its broader aspects comprehends oxidizing slimes with an oxygen-containing gas such as air to form an oxidized but unfused, and preferably friable, mixture of solids capable of withstanding a temperature above about 1000° F. without fusing and heating without fusing the oxidized mixture at a temperature above about 1000° F. until substantially all the selenium values in the oxidized materials are volatilized therefrom as selenium dioxide. Thereafter, the volatilized selenium dioxide may be recovered by absorption in water and elemental selenium precipitated from the solution with sulfur dioxide.

The slimes obtained from the tankhouse in the electrolytic refining of copper may contain up to 2% to 20% or more of selenium in more or less complex mixture with other elements including noble or precious metals with the selenium present in the form of elemental selenium and selenides.

During the oxidation of the slimes in the present process, the selenium values therein are believed to be converted by the oxygen in the oxygen-containing gas into metal selenite and selenate salts which are thermally decomposed to liberate the selenium dioxide. Also during the oxidizing, other oxides or oxygen-containing compounds of various oxidizable material present are formed which are thermally stable at the temperatures of the process.

It has been found further that many unoxidized slimes are completely fused in the temperature range of about 750–1000° F., and that other slimes are partially fused or display a strong tendency to fuse in and below this range of temperature. Properly oxidized slimes, however, are not fused or fusible at these or the higher volatilizing temperatures, depending upon the degree of oxidation of the slimes. Most slimes, however, fuse at temperatures above about 1650° F. regardless of the degree of oxidation. In most cases, therefore, the volatilization of the selenium dioxide in the present process is accomplished at temperatures below about 1650° F., preferably in the range 1000–1400° F., and for best results in the range 1100–1300° F.

In the course of extensive experimentation, it has been discovered also that the rate of heating and the rate of oxidation are of crucial importance in the formation of the unfused and unfusible oxidized mixture and must be controlled so that the rate of oxidation is, so to speak, "ahead" of the rate of heating in order to prevent fusion during oxidation. Thus, in a narrower sense, the invention also comprehends heating slimes through a temperature of about 1000° F. while controlling the rate of oxidation in relation to the rate of heating to form an oxidized mixture which, as it is exposed to a particular temperature during the heating, will withstand at least such temperature without fusion.

Control of either or both the oxidation and the application of heat may be accomplished in a number of ways to prevent fusion of the slimes. Thus, the application of heat to certain slimes may be such as to maintain them at a low temperature at which the unoxidized slimes will not fuse and while at such low temperature oxidizing the slimes with an oxygen-containing gas until the oxidized mixture is able to withstand the desired volatilizing temperature without fusion. Preferably, however, the slimes are simultaneously heated and oxidized as rapidly as possible through a temperature of 1000° F. at rates which are consistent with the formation of the unfused and unfusible oxidized mixture. In these or other procedures the fusion point of the slimes or of the oxidized or partially oxidized slimes may be determined by determining the fusion point of a sample thereof.

The slimes preferably are swept with a current of air or other oxygen-containing gas during both the oxidation and the evolution steps. In such procedure the evolved selenium dioxide gas is efficiently swept away from the slimes and out of the volatilization zone for further processing. In addition, the slimes may further oxidize during the volatilization step, thereby also preventing fusion during the process, especially where high volatilization temperatures are used.

The gaseous selenium dioxide evolved from the slimes is, in the preferred mode of practicing the invention, recovered by absorption in water and the solution is filtered to remove slime dust that unavoidably is entrained in the roaster gases. Thereafter, elemental selenium of at least commercial grade in quality is precipitated from the filtered and clarified solution with sulfur dioxide.

In this recovery procedure, any sulfur dioxide that may be present in the evolved gases precipitates elemental selenium. Such precipitation, however, is undesirable as it may cause difficulties during the absorption. In addition, such precipitated selenium is or would be lost to the process unless the filter residues are reprocessed as slimes or otherwise extensively treated, for example, by distillation, to recover their selenium content. One of the advantages of the invention is that relatively little sulfur dioxide is liberated during the process and such quantities as are liberated do not interfere to any appreciable extent with the absorption of the selenium dioxide or precipitate unduly large amounts of selenium in the absorbers.

It has been found that such difficulties as are evidenced by the evolution of sulfur dioxide may be further reduced by conducting the selenium dioxide evolution step in the presence of air or an oxygen-containing gas. For this reason also, the presence of such a gas is preferred during the step. Preferably, this is accomplished by sweeping the slimes with a stream of air during both the oxidation and the evolution steps.

The process may be conducted in a Herrshoff furnace or apparatus of similar type in which the slimes are fed into the top of the furnace and rabbled downwardly therethrough while passing air through the furnace concurrently or countercurrently in contact with the charge. Good results may be obtained with this type of apparatus. It is, however, not the most preferred because it has been found after much experimentation that, in apparatus of this type, the process usually must be conducted relatively slowly and with much caution in order to prevent fusion. In addition, the rabbling of the slimes tends to cause an undue amount of dusting, thereby resulting in larger amounts of residue from the clarification of the absorption liquid. Such dusting increases the possibility of the loss of slimes and the metal values therein in the exhaust gases from the process.

It has been found that when certain compounds are added to the slimes before or during oxidation, the oxidation and volatilizing steps may be conducted more rapidly. The compounds of copper and iron—these latter two metals appearing in the fourth row of elements of the periodic table of elements—display such ability in the process. Thus, for example, the process may be conducted at otherwise incipient fusion temperatures but fusion nevertheless may be avoided by adding incremental amounts of the compound or compounds upon the appearance of incipient fusion of the oxidizing mixture.

The reason for the phenomenon displayed by such compounds is not clear. It may be that the added compound or compounds raise the fusion point of the mixture by the formation therewith of new compounds having a higher fusion point. On the other hand, the addition of sand has no effect on the oxidation of the material to be treated. It may be, therefore, that the added compound or compounds function by accelerating the oxidation of the slimes.

Although oxides and sulfates of iron or copper, or both, may be used, the oxides are preferred as they introduce no additional sulfur into the slimes. Oxides of copper are preferred over those of iron because it is undesirable to introduce iron into the slimes, particularly when the residual slimes are to be leached to recover the copper therein and the leach liquor is returned to the tankhouse electrolyte.

It has been found, quite unexpectedly, that the process of the invention may be practiced with superior results by conducting the oxidation and volatilization on an endless belt or belts, by means of which the slimes are passed at controlled speed through oxidation and volatilization zones in the form of a thin bed in which the particles of the slimes on the bed or beds are maintained substantially without relative motion with respect to each other. By controlling the rate of travel of the belt or belts, the oxidation and volatilizing steps can be conducted with rapidity and ease. Friable but unfused oxidized slimes are readily formed from which the selenium values as selenium dioxide can be rapidly volatilized without fusing. For best results, the slimes on the endless belt or belts are heated principally or entirely by radiant heat which preferably is supplied from above the bed of the slimes.

A number of important advantages result from the use of the endless belt type of apparatus. Slimes which can be treated in a Herrshoff or Herrshoff-type furnace only slowly and with considerable caution in order to avoid fusion, are treated rapidly and with ease on an endless belt or belts. Moreover, there is much less dusting because of the absence of rabbling and this is true even when the preferred friable slimes are in a somewhat broken-up state, as occurs when more than one belt is used and the slimes are transferred from one belt to another. Thus, there is much less likelihood of loss of slimes and their valuable metal content due to the reduced dusting. Preferably, therefore, the process is conducted on one or more endless belts.

The process may be practiced with dried or raw wet slimes. Acid leached, washed or unwashed slimes may also be used although, in general, unwashed and unleached slimes are preferred since the additional copper content in the slimes is beneficial in enhancing the formation of the unfused and unfusible oxidation mixture.

The invention is further illustrated in the accompanying drawings and the following examples. It should be understood, however, that the drawings and the examples are given for purposes of illustration and that the invention in its broader aspects is not limited thereto.

In the drawings, Fig. 1 illustrates the most preferred mode of practicing the invention, and apparatus therefor.

Fig. 2 is a horizontal section taken on the line 2—2 of Fig. 1, illustrating an endless belt construction on which the slimes may be oxidized and roasted.

Referring now to the drawing, the numeral 1 represents a furnace provided with an endless belt hearth 2. The numeral 3 represents means for separating selenium dioxide from a gas and may be scrubbing tower which may be a packed or plate tower or provided with other means for intimately contacting the gas with a scrubbing liquid to absorb the selenium dioxide from the gas. The numerals 7 and 9 designate filters, and numeral 8 represents a selenium precipitation tank.

The furnace 1 may be lined with an appropriate refractory material 10, such as firebrick. It houses the endless belt hearth 2, as indicated in Fig. 1. The furnace is provided with a plurality of burners 11 disposed downwardly in the top of the furnace to provide radiant heat to the endless belt hearth therein.

The endless belt hearth 2 is suitably mounted on rotatable supports 12 and 13, either or both of which may be positively driven. The endless belt may be fabricated from metal or other suitable material to withstand the temperatures to which it is exposed. Although it may be fabricated from a material such as sheet metal so as to be impervious to gases, it preferably is of a pervious construction.

The preferred pervious construction of the belt is illustrated in Fig. 2 which shows a closely woven wire mesh endless belt. The variable speed drive for the belt hearth may be provided by means of motor 14 operatively connected to the pulley 12 by means of belt 15 and pulley 16, the latter member being fixedly attached to cylinder 12.

The furnace 1 preferably is provided with a refractory wall or partition 17 dividing it into an upper compartment 18 and a relatively shallow lower compartment 19. With such arrangement, the products of combustion from burners 11 pass directly to the atmosphere through outlet 20 and do not contact the slimes in compartment 19. Instead, the burners in compartment 18 heat the partition 17 which in turn radiates heat to the slimes on the belt 2. The moving bed of slimes is swept and contacted by a stream of air which enters the furnace at both ends adjacent the ends of the endless belt hearth 2. The air stream and the evolved selenium dioxide gas mixed therewith are withdrawn from compartment 19 through conduit 21 by means of an exhaust blower 22 located in the outlet 23 of scrubber 3.

In conducting the process as illustrated in Fig. 1, dry or raw wet slimes, which may or may not have been previously washed, are fed from the hopper 24 at a controlled rate to the belt 2 at the left end of the furnace 1 to form a thin bed of slimes of uniform thickness which, for best results, is not in excess of about 1″ in thickness. The depth of the slimes bed may be controlled by a dead plate 25 which may be attached to the lower interior edge of the hopper 24.

The speed of the belt and the firing of the burners are controlled to oxidize the slimes and volatilize the selenium dioxide therefrom at the desired evolution temperature or temperatures, and to discharge from the belt a friable but unfused slime residue. This is most effectually accomplished by firing the burners at a uniform rate and varying the speed of the belt while sweeping the slimes on the belt with a stream of air which is at least in sufficient volume to draw the evolved selenium dioxide into the conduit 21. Such an amount of air amply supplies the oxygen requirements of the slimes.

The exit gases from compartment 19 are led through conduit 21 into absorber 3 where the gases are scrubbed to dissolve their selenium dioxide content. The residual gases then are exhausted from the system through outlet 23 in the absorber 3. The aqueous solution containing the dissolved selenium dioxide is passed through conduit 27 to filter 7 where the solution is clarified by filtering. The residue from the filter 7 which is, for the most part, slimes dust unavoidably entrained in the exit gases from compartment 19, may be treated further to recover the metal values therein.

The filtrate is passed to precipitation tank 8 in which elemental selenium is precipitated from the clarified liquor by bubbling therethrough gaseous sulfur dioxide. The precipitated selenium is separated from the solution by filtration in filter 9. The thus separated selenium is recovered as a product from the process and the filtrate is discarded or otherwise discharged from the system.

If desired, the air stream sweeping through the compartment 19 may be directed upwardly or downwardly through the slimes bed. Also, the partition wall 17 may be dispensed with and the products of combustion from the burners may be withdrawn through conduit 21, in which case the slimes are treated both by radiation and by direct contact with the hot gases. This latter alternative, however, is not preferred as it unduly dilutes the selenium dioxide concentration in the gases to the absorber and results in less efficient absorption.

Instead of a single endless belt hearth, a plurality of such hearths may be used, all of which may be housed in the same or in separate furnaces. Thus, for example, with wet slimes two endless belt hearth furnaces may be used. The slimes may be dried or dried and partially or completely oxidized to a friable state on the first belt. The friable slimes may then be transferred to the second belt where they may be in a somewhat broken up condition due to the transfer. Further oxidation and the volatilization of the selenium dioxide from the slimes may then be accomplished on the second belt.

*Example I*

Unwashed raw slimes, having the following analysis on a dry basis were treated by the process and in the apparatus illustrated in Fig. 1:

| | Percent |
|---|---|
| Se | 9.10 |
| As | 4.45 |
| S | 5.13 |
| Te | 0.95 |
| Cu | 21.2 |
| Pb | 10.3 |
| Sb | 4.4 |
| Ag | 18.1 |
| Au | 0.73 |

The inside housing dimensions of the furnace were 6 ft. long by 2 ft. wide. The top wall of compartment 18 was provided with 10 standard burners arranged in two rows uniformly distributed longitudinally of the top wall. The endless belt 2 was a woven #21 herringbone wire mesh belt. The belt was 15" wide and the distance from the center of supports 12 and 13 was 12 ft. The wall 17 was constructed of Carborundum and was disposed 4" above the upper surface of the belt 2.

The burners were fired at a uniform standard rate, consuming 6.4 pounds/hr. of fuel oil having a total heating value of 534,000 B. t. u./hr. The raw dry slimes were fed from the hopper 24 at a rate controlled by the speed of the belt. The dead-plate 24 was adjusted to control the depth of the slimes bed on the belt to about ¼" in thickness. The speed of the belt was controlled by controlling the speed of the motor 14 so as to discharge friable but unfused slimes residue from the belt. The radiant temperature in compartment 19 was 1460–1510° F. The temperature of the slimes at the point indicated by letter "A" in Fig. 1 which was about one foot from the right inside wall of the furnace, was 1200° F. The exhaust fan 22 was operated at a rate to withdraw the evolved selenium dioxide through conduit 21.

375 pounds of the above dried raw slimes were charged to the furnace 1 over a period of 10 hours. The residence time of the slimes in compartment 19 was about 15 minutes. The over-all average speed of the belt was 0.56 ft./min. 94.6% of the selenium values in the raw slimes was eliminated from the charge. The selenium product recovered from filter 9 was of good commercial grade. Analysis of the slimes residue discharged from the belt showed a selenium content of 0.6%.

*Example II*

The procedure of Example 1 was repeated but in this case the slimes were twice passed through the furnace 1. In the first pass the raw wet slimes were dried and partially oxidized at a belt speed which averaged about 3.3 ft./min. The firing rate of the burners was reduced to about one-half of that of Example I. The slimes were discharged from the belt in a friable but unfused condition. The bed temperature of the slimes at the point A of Fig. 1 was 212° F. and the discharged slimes contained 5% moisture. The radiant temperature in compartment 19 was 740–810° F. inside the entrance and was 860–940° F. at the exit.

The dried and partially oxidized slimes were again passed through the furnace. In the second pass the burners were fired at the rate set forth in Example I and the belt speed averaged 0.56 ft./min. 96.3% of the selenium values in the slimes were eliminated. The selenium product recovered from filter 9 was also of commercial grade. The slimes residue discharged from the belt in the second run contained 0.4% selenium and was in a friable but unfused condition.

*Example III*

A top-fired, muffle Herrshoff furnace having a single 54-inch hearth was substituted for the endless belt furnace of Fig. 1. A double rabble arm was mounted on the hearth and was driven by a gear and pinion entering the hearth from below. The charge of slimes was introduced adjacent the center of the hearth by a screw conveyer and was rabbled to the outer edge thereof and discharged through an opening on the hearth's periphery. A stream of air during the test was introduced on one side of the hearth adjacent the residue discharge outlet and a gas outlet on the other side of the hearth was connected to conduit 21.

800 pounds of dry, unwashed raw slimes having a selenium content of 8.3% were charged during a period of 8 hours to the hearth at the rate of 100 pounds per hour and oxidized thereon. The radiant temperature above the hearth was 750–820° F. and the residence time of the slimes on the hearth was one hour. Fusion or partial fusion of much of the charge took place during this oxidation step and no perceptible amount of selenium was eliminated.

500 pounds of the oxidized charge was broken up and again charged to the hearth at the rate of 75 pounds per hour for a period of 7 hours, to volatilize the selenium therefrom. The radiant temperature above the hearth was 1100–1300° F. and residence time of the slimes on the hearth was 1 hour. 77.7% of the selenium values in the slimes were eliminated during this volatilizing step and the slimes residue contained 1.9% selenium.

*Example IV*

The procedure of Example III was repeated using the same dry, unwashed raw slimes. In this case, however, 2035 pounds of the slimes to which had been added 10% by weight of a copper oxide slag, were charged to the furnace during the oxidation step. The slimes were charged at a rate of 100 pounds per hour over a period of 21 hours. The radiant temperature above the hearth was 750–820° F. and the residence time of the slimes on the hearth was 1 hour. No fusion took place and no perceptible amount of selenium was eliminated during the step.

1378 pounds of the oxidized slimes were again charged to the hearth during the volatilization step at the rate of 75 pounds per hour over a period of 18.5 hours. The radiant temperature above the hearth was 1140–1340° F. and the residence time of the slimes on the hearth was 1 hour. No fusion of the charge took place. 94.1% of the selenium values in the slimes were eliminated during this volatilizing step and the slimes residue contained 0.5% selenium.

*Example V*

Two 100-gram samples of dry slimes having the following typical analysis were heated in the manner described below.

|   | Percent |   | Percent |
|---|---|---|---|
| Copper | 23.5 | Total Sulfur | 5.8 |
| Silver | 16.9 | Sulfate Sulfur | 5.3 |
| Gold | 0.705 | Sulfide Sulfur | 0.5 |
| Lead | 10.3 | Water Soluble Sulfate Sulfur. | 3.4 |
| Selenium | 8.3 |  |  |
| Tellurium | 2.2 |  |  |

Each of the two samples was carefully oxidized in a furnace for 1 hour at 750° F. using an excess of air during this period. No fusion resulted during the oxidation and the oxidized slimes were able to withstand temperatures above 1100° F. without fusion. An analysis of the oxidized slimes showed that the total sulfur content was 5.6 grams.

Each of the oxidized samples was heated for a period of 2 hours at a temperature of 1100° F. without fusion of the slimes during this period to volatilize selenium dioxide therefrom. During this volatilization period one of the samples was swept with a stream of air at the rate of 500 cc. per minute. The other sample was swept with a stream of nitrogen at the rate of 500 cc. per minute. The analysis of the samples at the end of this period was as follows:

|   | Air Sweep | Nitrogen Sweep |
|---|---|---|
| Weight loss percent | 8.9 | 8.9 |
| Selenium content do | 0.02 | 0.06 |
| Total sulfur content grams | 5.4 | 4.6 |

These results indicate that when the slimes are swept with an oxygen-containing gas such as air during the volatilization, about 2.5% of the evolved selenium may be precipitated in the absorber system by evolved sulfur dioxide. When the volatilization is conducted so as to exclude air about 7.5% of the selenium may be precipitated in the absorber system. Such precipitated selenium, therefore, may be about three times as great in the absence of an air sweep as when such a sweep is used in this step.

From the above disclosure it will thus be seen that the present invention affords a relatively simple and efficient method of removing the selenium values from slimes by oxidizing the slimes with air or other oxygen-containing gas and roasting the selenium from the slimes as selenium dioxide, while maintaining the slimes in an unfused but preferably friable state during the oxidizing and roasting. By the practice of the invention, 90% and more of the selenium values in the slimes are readily recovered as commercial grade elemental selenium.

We claim:

1. A process for removing the selenium values from slimes, sludges and anode muds from the electrolytic refining of copper, without prior removal of the copper from such material which comprises oxidizing said material by heating same through a temperature above about 1000° F. in the presence of an oxygen-containing gas while controlling the rate of heating and the rate of oxidation to form an oxidized, unfused but friable mass which as it is exposed to a particular temperature during the heating withstands at least such temperature without fusing; and, without decopperizing the thus oxidized mass, heating without fusing same at a temperature above about 1000° F. until substantially all the selenium values therein are volatilized therefrom.

2. A process according to claim 1 in which said material is in the form of a thin, moving, undisturbed bed as it is subjected to oxidation and volatilization steps.

3. A process according to claim 2 in which the material to be treated in the process is a dry material.

4. A process according to claim 3 in which the material is washed before it is dried.

5. A process for removing the selenium values from slimes, sludges and anode muds from the electrolytic refining of copper which comprises moving a thin bed of such material not exceeding about one inch in thickness through radiantly heated oxidation and volatilization zones while sweeping said zones and the bed therein with a stream of air; controlling the rate of travel of said bed through said oxidation zone to oxidize said material therein and to form it into an unfused but friable mass, capable of withstanding temperatures above about 1100° F. without fusing; and controlling the rate of travel of the bed through the volatilization zone to heat without fusing therein the thus oxidized material at a temperature in the range of about 1100–1300° F. until substantially all the selenium values in the oxidized material is volatilized therefrom.

6. A process for removing the selenium values from slimes, sludges and anode muds from the electrolytic refining of copper, which comprises oxidizing said material without added acid by heating same below 1000° F. in the presence of an oxygen-containing gas under controlled heating and oxidation conditions for a sufficient length of time until an oxidized but unfused material capable of withstanding a temperature above 1000° F. without fusing is formed thereby forming a material in which substantially all of the contained selenium values are in the form of values which are thermally stable at temperatures below about 1000° F. but which are rapidly thermally decomposable at temperatures above 1000° F. to liberate selenium dioxide, and thereafter heating without fusing the thus oxidized material at a temperature above 1000° F. until substantially all the selenium values therein are volatilized therefrom.

7. A process according to claim 6 in which a compound selected from the group consisting of oxides and sulfates of copper and iron and mixtures thereof are added to said material during said oxidation step whereby the oxidation may be conducted at a higher temperature and rate than would be possible in the absence of said added compound.

References Cited in the file of this patent

UNITED STATES PATENTS

| 2,121,602 | Lloyd et al. | June 21, 1938 |
| 2,322,348 | Clark | June 22, 1943 |
| 2,406,666 | Clark | Aug. 26, 1946 |